Figure 1:
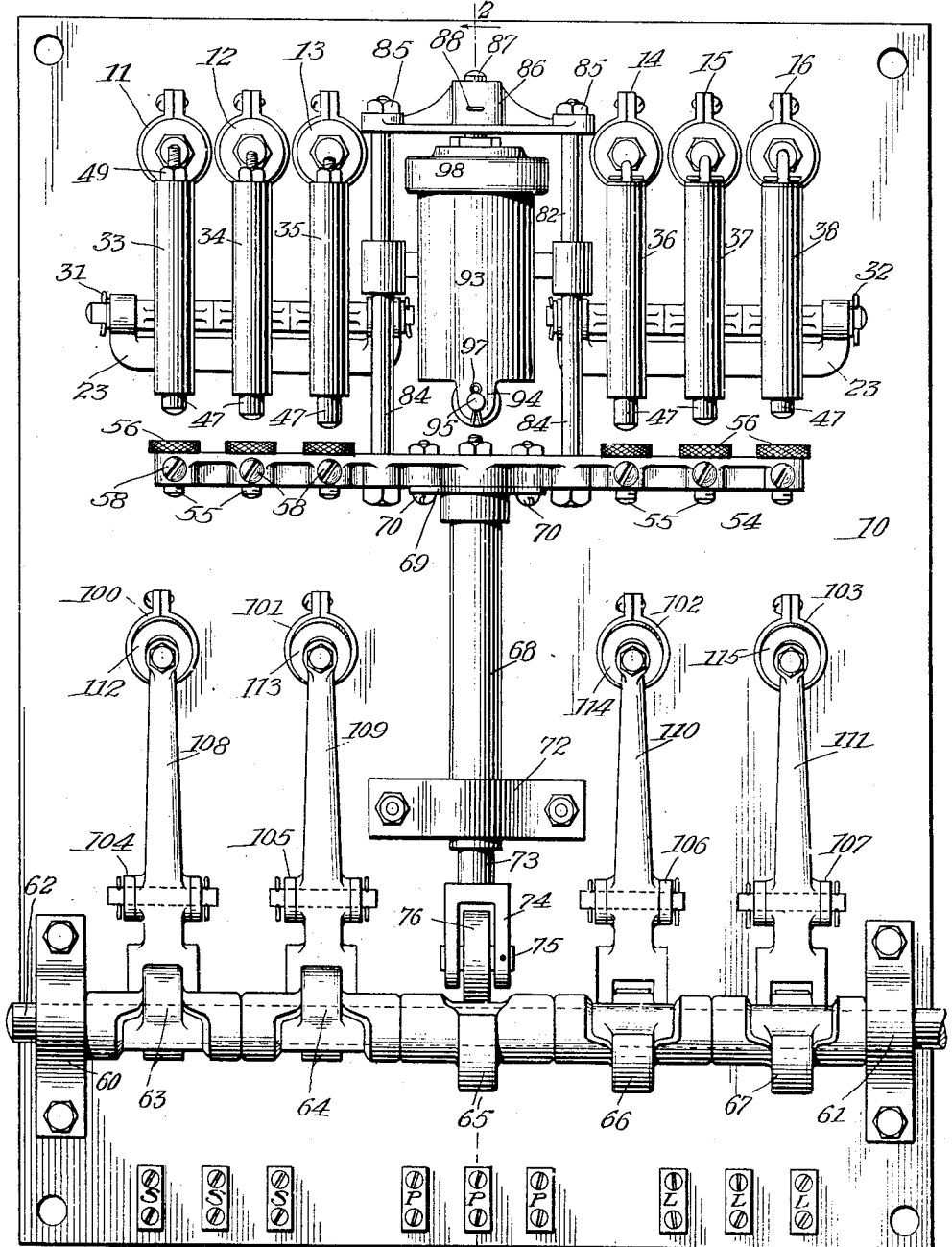

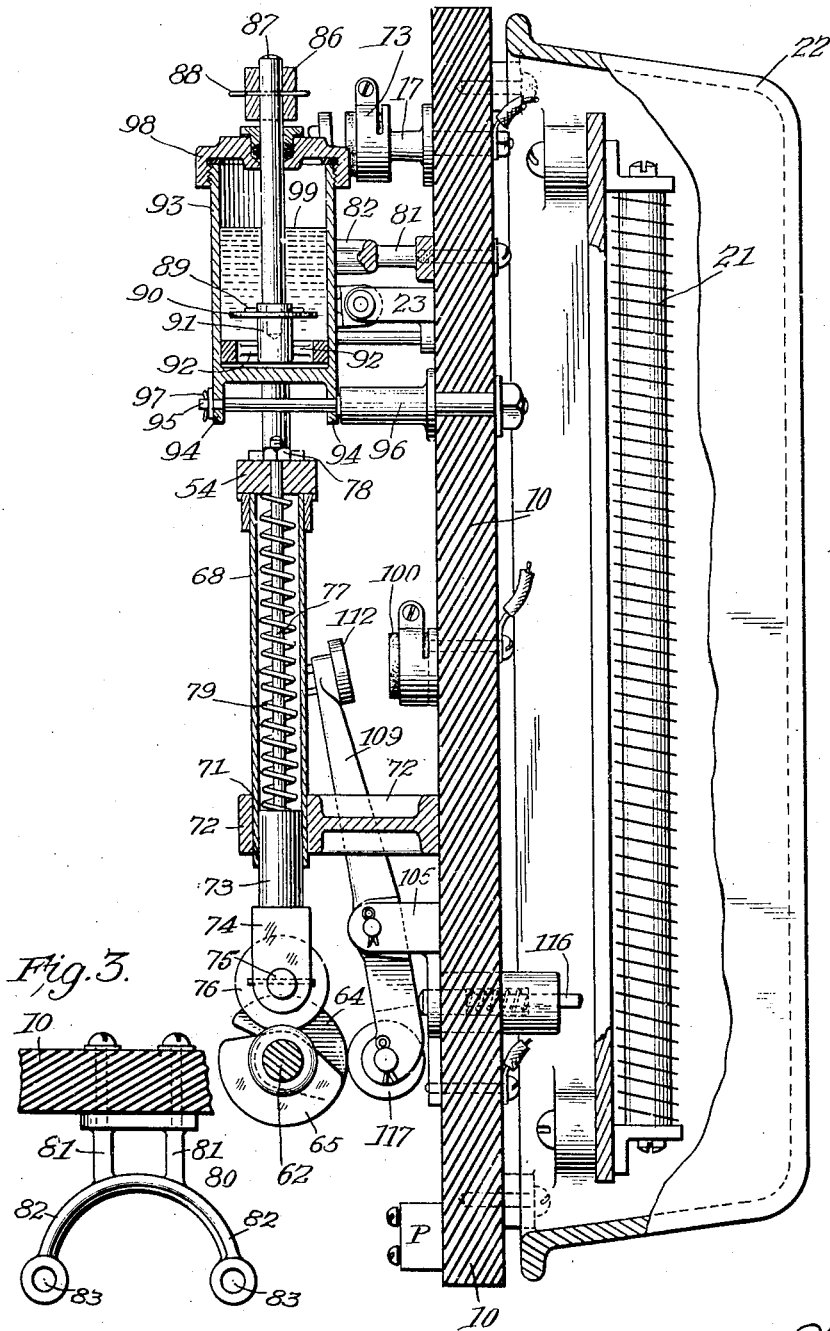

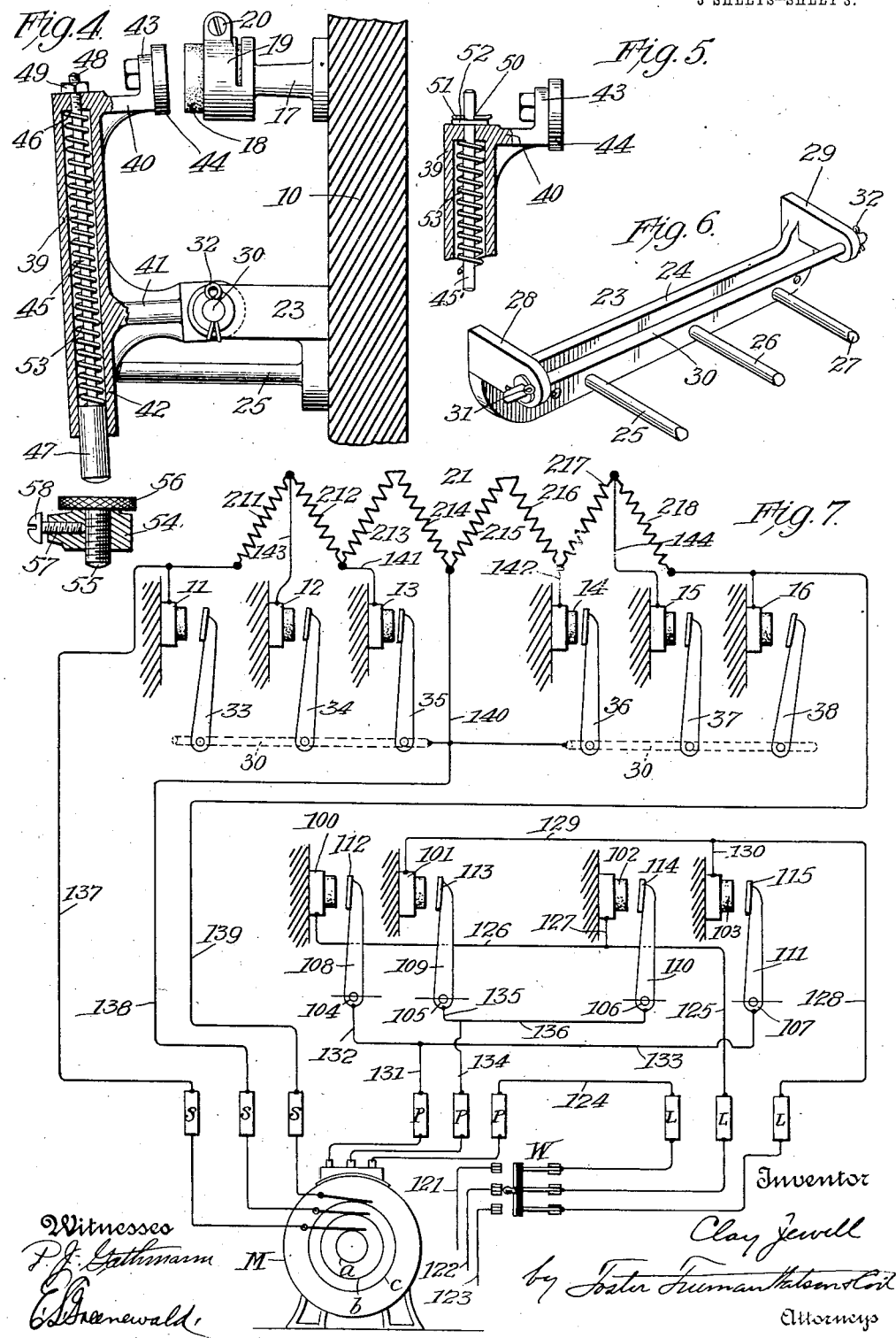

UNITED STATES PATENT OFFICE.

CLAY JEWELL, OF BALTIMORE, MARYLAND.

MOTOR-CONTROLLER.

1,113,901.  Specification of Letters Patent.  Patented Oct. 13, 1914.

Application filed August 24, 1912. Serial No. 716,926.

*To all whom it may concern:*

Be it known that I, CLAY JEWELL, a citizen of the United States, and resident of Baltimore, Maryland, have invented certain new and useful Improvements in Motor-Controllers, of which the following is a specification.

This invention relates to motor controlling devices, and particularly to a starter and reverser for alternating motors, operating elevators and like apparatus.

In an alternating current motor of the induction type the speed of the rotor for which maximum torque occurs depends on the resistance of the rotor windings, and as it is particularly desirable in operating elevators, etc. to produce the maximum torque immediately on starting, it is the usual practice to provide resistance for the rotor windings which may be gradually cut out as the motor comes up to full speed. The resistances for starting purposes may be inserted in the primary circuit, and rush of the current prevented by reducing the applied voltage at starting, but as inserting resistance in the primary winding quickly reduces the torque it is preferable to insert the resistance in the secondary to thereby obtain a lower starting speed and consequent large torque.

One of the objects of the invention is to provide a simple and reliable controlling mechanism for use with alternating current motors which operate elevators and similar apparatus so that the motor may be started, stopped and reversed at will.

Certain features in the controlling device may be embodied in other types of motor controllers.

The above and other objects and novel features of the invention will be apparent from the following description taken in connection with the drawings in which:

Figure 1 is a front elevation of the controlling device embodying my invention showing the same in a neutral or off position. Fig. 2 is a central vertical section of Fig. 1, along the line 2—2 showing parts in elevation. Fig. 3 is a detailed view of the bracket and guide for the rods carrying the cross-head for the piston operating in the dash-pot cylinder. Fig. 4 is a detailed view, partly in section, of one of the contactors, and its coöperating parts showing the bar for actuating the same.

Fig. 5 is a fragmental view of a modified form of the contactor. Fig. 6 is a perspective view of a bracket for pivotally supporting and electrically connecting a bank of contact members. Fig. 7 is a diagrammatic view of the electrical connections employed in carrying out my invention.

Referring to Figs. 1 and 2, the numeral 10, designates a back or slab of marble, slate or suitable material for supporting the various elements of the controlling device and insulating them from one another. Three contact blocks 11, 12 and 13 are mounted on one side of the center of the back 10 and three other contact blocks 14, 15 and 16 are mounted on the other side of the center, thereby providing two banks in the contact blocks symmetrically arranged on the slab 10. Each of these contact blocks 11—16, comprises a stand 17, secured to the front of the switch-board 10, and a carbon block 18, set and secured in a split section 19, of the stand 17. A threaded screw 20, passes through ears on the split section 19, and draws the end of said section together securely holding the carbon block 19. A suitable resistance 21, is inclosed and supported by a casing 22, which is mounted on the back of the panel 10. An inductive or non-inductive resistance may be employed. However, it is preferable to use a series of eight suitable resistance tubes, 211 to 218 inclusive, as indicated diagrammatically in Fig. 7 and one of which is shown in full in Fig. 2. The contact blocks 11—16 are connected at different points of resistance 21 for a purpose to be brought out. Immediately below each bank of contacts, 11, 12, 13 and 14, 15, 16, there is a bracket member 23, shown in perspective in Fig. 6. The bracket 23, is secured to the panel 10, and comprises a base 24, having cast integral thereon, the abutments 25, 26 and 27, intermediate its ends, and the bearing sections 28 and 29 at the ends thereof. The bearings 28 and 29, are disposed at right angles to the base 24 projecting outwardly from the panel to which the bracket is secured. The outer ends of the bearings 28 and 29 have holes bored therethrough to receive the longitudinal pivot pin 30, which pivotally supports the contacting members to be described. To provide for easily assembling the contacting members and against accidental displacement of the pivot 30, the latter is provided, adjacent its ends, with holes to accommodate the cotter pins 31 and 32.

Each bracket 23, supports a series or bank of contactors or short circuiting members 33, 34, 35 and 36, 37, and 38 to coöperate with the contact blocks 11, 12, 13 and 14, 15, 16 respectively.

As indicated in Fig. 4, each short circuiting member includes a tubular portion 39, having at its opposite ends lateral extensions 40 and 41. The extension 41, is bored to receive the pivot pin 30, whereby the short circuiting members are each pivoted on the bracket 23. The pin 30, and the bracket upon which it is mounted, are of metal and therefore electrically connect the short circuiting members mounted thereon. The tubular portion 39, has a section 42, extending below the lateral extension 41, which section 42 abuts against the abutment 25, 26, or 27, as the case may be. The lateral extension 40, at the upper end of each short circuiting member has a foot 43, to which a suitable contacting plate 44, is bolted. Contacting plate 44, coöperates with the contact block 18, when the short circuiting members are actuated. Arranged in tubular portion 39, is a thrust pin comprising a shank 45, of a size to slidingly fit in an opening 46 in the head of the tubular member and terminating at the lower end in a head 47, of a size to slidingly fit into the tubular portion 39, at its lower end. The pin is somewhat greater in length than the length of the tubular portion 39, and the upper end portion of the shank thereof is screw-threaded as shown at 48, and engages the threads of a jam nut 49, which bears on the upper end or head of the tubular portion 39, and thereby limits the downward or outward movements of head 47, and provides for adjustment of the pin so that the head 47, will extend to a required distance below the tubular portion 39.

Fig. 5, shows a slight modification of the arrangement in which the stem 45' is not adjustable, but is provided at its outer end with a transverse hole 50, to receive a cotter pin 51, so that the thrust pin is removably held in the tubular portion of the short circuiting member. A washer 52, of suitable material, provides a bearing surface for the cotter pin 51. The head 47, is yieldingly held in projected position by means of the thrust spring 53, surrounding the shanks or stems 45, or 45' and bearing on the inner end of the head 47 and the upper end of the tubular body 39.

A bar 54 underlies the heads 47, of the pins on the short circuiting members and at points in alinement with the said heads, the bar is provided with openings which receive the threaded shanks 55, of the bearing plates 56, which are provided with knurled edges. The bar 54, is further provided with a plurality of openings 57, at right angles to the openings for the shanks 55. The said openings 57 receive set screws 58, the inner ends of which bind on the shanks 55 and serve to lock the latter in any desired position of adjustment as clearly shown in Fig. 4.

As shown in Fig. 1 the lower ends of heads 47 are different distances above the bearing plates 56, these varying distances being obtained by means of adjusting nuts 49, or the positions of the holes 50. The object of this arrangement is to successively cut out sections of the resistance which is accomplished by the short circuiting members when they engage the contact blocks 11 to 16, to which different points in the resistance 21 are connected.

It will be observed that the short circuiting members 33 to 38 by virtue of the extension 40 and the contact face 44 projecting beyond a vertical plane taken through their pivots 30, are over-balanced whereby the contact portions of the short circuiting members will move outwardly and away from the contact 18, by gravity when the bar 54, is released. The outward movement of the short circuiting members is limited by the abutments 25, 26, and 27 mounted on the bracket 23 as heretofore set forth.

Bearings 60 and 61 bolted to the panel 10, at opposite sides near the lower end thereof, receive the shaft 62 which may be rotated by means of a sprocket and chain, or other suitable devices (not shown) from the elevator or any other position about the apparatus to be operated by the motor M. A plurality of cams 63, 64, 65, 66 and 67 are keyed or otherwise secured to the shaft 62 to rotate therewith and operate the mechanism on the panel 10.

Centrally intermediate the ends of bar 54, there is a downwardly projecting cylinder or tube 68. The cylinder 68 has a flange plate 69 at one end and by means of screws 70, which extend through the flange plate 69 and the bar 54, the said cylinder 68 is rigidly secured to the bar 54 and moves therewith. The opposite end of the cylinder 68 is loosely mounted to slide vertically in an opening 71 in a bracket member 72 secured to the panel 10. Slidingly fitting into tube 68 at its lower end there is a plunger 73 which has an integrally connected forked portion 74 at its outer end. The forked portion receives a spindle 75 between the members thereof which spindle rotatably supports an insulating roller 76 of fiber or other suitable material adapted to have rolling contact with the cam 65.

The end of plunger 73, within the cylinder 68, has a stem or shank 77 which projects through the bar 54, and is threaded at its outer end to receive the nut 78 whereby the plunger may be longitudinally adjusted in the cylinder 68. The plunger 73, together with the forked portion 74 and roller 76 carried thereby, are yieldingly held in projected position by a spiral spring 79 surrounding the stem 77 and bearing against the plunger 73 and bar 54 by means of which the roller 76 is yieldingly held in contact with the cam 65.

The bracket 72 supports the cylinder 68, thereby supporting and guiding the bar 54 from the lower side. In its reciprocation the bar 54 is guided and maintained in alinement and the cylinder 68 is maintained in the alinement and prevented from binding in the opening 71 by means of a bifurcated bracket 80 which is secured to the panel 10 and comprises the supporting members 81 and curved bearing portions 82, having through openings 83 at their enlarged outer ends. The openings 83 are adapted to receive and guide the rods 84 which are connected to the bar 54 at opposite sides of the center and support the said bar. The rods 84 being rigidly connected to the bar 54 reciprocate therewith and slidingly support the said bar from above the same. The outer ends of the rods 84 are threaded to receive nuts 85 by means of which a cross-head 86 is secured thereto. A cotter pin 88 pivotally and removably connects the piston rod 87 to the cross-head 86. The piston rod 87 has a piston head 88 connected to its lower end by means of cotter pin 89, and between the pin 89 and the head 88, there is an annular plate 90 which fits loosely on the enlarged central portion 91 of the head and operates as a valve for the opening 92 through the piston head 88. The pin 89 limits the upward movement of the ring 90. The piston head 88 fits into a dash-pot cylinder 93, which has integral lugs at its lower ends which are bored to receive the shank 95 of a bracket 96 supported on the panel 10. By this means the cylinder 93 is pivotally mounted on the panel 10 so that there will be a slight play and no binding action will occur. A cotter pin 97 removably maintains the cylinder 93 on the shank 95. At its free or open end the cylinder has exterior threads thereon to receive interior threads on a removable cap 98 which is provided with suitable packing about the piston rod 87 and at the threaded joints to prevent the leakage from the interior of the cylinder of oil or other suitable working fluid 99.

It will be observed that the roller 76 and bar 54 yieldingly connected therewith is in a neutral position as shown in Figs. 1 and 2. When the shaft 62 is rotated in either direction a quarter of a turn or more the roller 76 will ride up onto the cam 65 and the plunger 73 connected to operate with the roller will reciprocate in the cylinder and compress the spring 79 against the bar 54 forcing the latter upward together with the rods 84 connected therewith. The piston head 88 and rod 87 connected to the rods 84, 84, by the cross-head 86 will be constrained to move outwardly, but the fluid 99 in the dash-pot cylinder 93 will afford a cushioning or retarding effect and prevent the immediate action of the bar 54. The spring 77 acts as an accumulator, and power will be stored therein, tending upon the expansion of the spring to complete the movement of the piston head 88 out to its limit to gradually carry the bar 54 and bearing plates 56 into successive engagement with the yielding pins 47 on the short circuiting members.

Arranged on the opposite sides of the center of the panel 10 and between brackets 23, 23, and 60, 61 respectively, are pairs of contact blocks 100, 101, and 102, 103 and pivoted in corresponding brackets 104, 105, 106 and 107 located immediately below the blocks 100, 101, 102, 103 inclusive, are levers 108, 109, 110 and 111. The levers 108 to 111 are fulcrumed intermediate their ends in the said brackets 104 to 107 respectively, and have at their upper ends contact faces 112, 113, 114 and 115 coöperating with the contact blocks 100 to 103 inclusive, and normally held in engagement therewith by a series of pins 116, pressed inwardly by springs against the levers 108, 111, below their fulcrums on brackets 104, 107. Each lever at its lower end is provided with a forked portion within which suitable insulated rollers 117 are mounted. The spring pressed pins 116, not only hold the levers in engagement with their respective contact blocks, but also hold rollers 117 in yielding engagement with the corresponding cams 63, 64, 66 and 67.

As will be observed from Fig. 1, the cams are arranged so that when the shaft 62 is turned in a clockwise direction the levers 110 and 111 will be forced into contact with their respective contact blocks and the circuit through the same will be closed, and in the meantime the plunger 73 has been raised and power stored in the spring 77 gradually forces the bar 54 upwardly into contact with the short circuiting members against the dampening or retarding action of the dash-pot 93. When it is desired to reverse the direction of the motor, the shaft is turned through an arc of substantially 180 degrees whereupon the rollers on the levers 110 and 111 will be engaged by the cams 66 and 67, and the rollers on the levers 108 and 109 will be forced into the mutilated portion of the cams 63, 64 and their upper ends carrying the contact faces 112 and 113 will engage contact blocks 100 and 101 closing the circuit and thus reversing the direction of the current and direction of the rotation of the armature.

A series of terminal blocks are mounted along the lower edge of the panel 10, as shown, being provided for the connection of a three-phase alternating current supply at blocks marked L, L, L, for the connection of the primary or inducing winding at the blocks marked P, P, P, and for the connection of a secondary or induced winding at blocks marked S, S, S.

In the diagrammatic view shown in Fig. 7, the device is shown as applied to a three-phase induction motor M. Alternating current mains 121, 122 and 123 may be connected through the switch W to the line terminals L, L, L. In order to reverse a three-phase motor it is only necessary to reverse the current flowing through two of the phases, and the other phase may be directly and permanently connected to one of the leads of the primary winding of the motor by conductor 124, as is indicated in Fig. 7. The main 122 is connected by means of conductor 125 to the branch circuit comprising conductors 126 and 127, which are respectively connected to contact blocks 100 and 102. The main 123 is, by means of conductor 128, connected to the branch circuits 129 and 130, which are respectively connected to the contact blocks 101 and 103. One of the remaining leads of the primary winding of the motor M, is connected by conductor 131 to a branch circuit comprising conductors 132 and 133 leading to the brackets 104 and 107 supporting levers 108 and 111 respectively. The other phase of the primary winding is connected by means of conductor 134 to a branch circuit comprising the conductors 135 and 136 which in turn are connected with brackets 105 and 106 supporting levers 109 and 110 respectively.

The secondary winding on the armature of the motor M is connected to slip-rings $a$, $b$, and $c$, carried by the armature shaft. The rings $a$, $b$, and $c$ are directly connected to the terminal blocks S, S, S. Conductors 137, 138 and 139 are each connected to the terminal blocks S, S, S, and to conductors 137 and 139 are connected the extremities of resistance 21, while the conductor 138, through branch conductor 140, connects to the middle point of said resistance. The conductor 138 is also electrically connected to the brackets 23, 23 and through pivot pins 30 on the latter to each of the contact members 33, 34, 35, 36, 37 and 38.

The resistance 21 is made up of a series of tubes 211 to 218, and at different points in the resistance connections are tapped off to the contact blocks 11 to 16. The contact blocks 13 and 14 are connected by conductor 141, 142 to points in resistance which joins tubes 212, 213 and 216, 217 respectively. Contact blocks 12 and 15 are connected by conductor 143 and 144 to points of resistance which join tubes 211, 212 and 217, 218 respectively. The contact blocks 11 and 16 are connected to the conductors 137 and 139 respectively.

It will be observed that when the shaft 62 has been rotated in a clock-wise direction the primary circuit will be immediately closed through the levers 110 and 111 completing the circuit from mains 122 and 123 as follows: main 122, conductor 125, conductor 127, contact block 102, lever 110, conductor 136, conductor 134, to a primary lead of the motor M. From the main 123, the conductor 128, conductor 130, contact block 103, lever 111, conductor 133, and conductor 131 to the other phase of the primary winding on the motor. The resistance of the secondary circuit is normally in, and when the shaft 62 is rotated, as indicated, the resistance will be gradually cut out and finally short-circuited when the motor comes up to speed. One-half of resistance 21 will be included between phase 137 and 138, and one-half will be included between phase 138 and 139, while the entire resistance will be included between phase 137 and 139. In the arrangement shown the operation of the bar 54, by engaging members 35 and 36, will first cut out resistance tubes 213, 214, in the phase 137—138, and tubes 215 to 216 in phase 138—139, and tubes 213, 214, 215 and 216 in phase 137—139. Further movement of the bar 54 will engage short circuiting members 34 and 37 and cut out resistance tubes 212 and 217, and finally when the bar engages the short circuiting members 33 and 38, the entire resistance will be cut out. The resistance in each phase is thus reduced one-half at each successive engagement of pairs of short circuiting members. The arrangement requires only two banks of contact blocks and coöperating short circuiting members and admits of a balanced and symmetrical disposition of all operating parts. When it is intended to reverse the rotation of the armature from the neutral position, a quarter turn of shaft 62 in the counter clock-wise direction will throw the levers 108 and 109 into engagement with the contact blocks 100 and 101 respectively, and the direction of the current flowing through two phases of the primary winding will be reversed causing the reversal of the rotation.

When the shaft 62 is rotated from either operative position to the inoperative or "off" position, the short circuiting members will be released as the bar and its coöperating parts move downwardly to the neutral position by gravity and the resistance 21 will be restored into its series connection with the secondary winding by gravity. Moreover, the resistance will always be in series with the secondary or armature winding until after the current supply has been completely connected to the primary or field winding, thereby preventing any damage to the motor armature by rush of current therethrough.

It will be seen that I have provided a simple and efficient arrangement for controlling alternating current motors for the purpose described, and one in which the resistance in the secondary winding is in circuit until after the primary winding has been connected to the main line, and then is gradually cut out as the motor comes up to speed. The force of gravity positively restores the resistance to its initial condition upon release of the actuating mechanism or the movement of the same to "off" position.

As various modifications may be made in the device without departing from the spirit of the invention, I do not wish to be limited to the exact details as shown and described, only as required by the appended claims.

What I claim is:

1. In a motor controller, the combination with a starting resistance, of short circuiting means coöperating with said resistance, and a device for operating the short circuiting means comprising a bar, a tubular member, and a plunger member working in the tubular member, one of said members being connected to the bar and the other member being held in yielding relation thereto.

2. In a motor controller, the combination with a starting resistance, of a series of contact blocks connected with different points in said resistance, a series of pivotally mounted short circuiting members adapted to coöperate with the contact blocks, and means for operating said members comprising a bar, a tubular member connected to the bar, a plunger fitting in the tubular member and projecting from one end thereof, and means for reciprocating said plunger so as to actuate the operating means.

3. In a motor controller, the combination of a starting resistance, a series of contact blocks connected with different points in said resistance, a series of electrically connected and pivotally mounted short circuiting members coöperating with said contact blocks, means for successively moving the short circuiting members into engagement with the contact blocks comprising a bar, a tubular member secured thereto, a plunger having a stem working in the tubular member and projecting therefrom, a spring surrounding the stem and interposed between the plunger and bar and means for actuating the plunger, for the purpose described.

4. In a motor controller, the combination of a starting resistance, a series of contact blocks suitably mounted and electrically connected with different points of said resistance, a series of pivotally mounted, independently movable, electrically connected short circuiting members, means for successively moving the short circuiting members into engagement with the contact blocks comprising a bar adapted to engage the short circuiting members, a cylinder connected to move with the bar, a plunger resiliently telescoping in the cylinder and having a part projecting from said cylinder, means associated with the plunger for reciprocating the bar and means for retarding the movement of the bar and cylinder.

5. In a motor controller, the combination with a starting resistance, of short circuiting means coöperating with the resistance, a device for operating the short circuiting means comprising a bar, a tubular member, and a plunger member working in the tubular member, one of said members being connected to the bar, a yieldable element interposed between the bar and the other member, and means adapted to move said bar and the members associated therewith to operate the short circuiting means.

6. In a controller for motors, the combination of a starting resistance, a series of short circuiting members associated therewith, and means for operating said short circuiting members comprising a reciprocable bar, a tubular member secured to and depending from the lower side of said bar, a plunger resiliently seated in the tubular member and projecting from the lower end thereof, a dashpot cylinder mounted above the bar and a piston connected to the bar and working in said dashpot cylinder.

7. In a controller for motors, the combination of a starting resistance, a series of short circuiting members asociated therewith, and means for operating said short circuiting members comprising a vertically movable bar, a tube depending from the bar and having one end secured to the bar, a bearing for slidably supporting and guiding the other end of the tube, a yieldingly mounted plunger operating in the tube and accessible from the exterior thereof, a rod arranged parallel to the tube and connected to the bar on the side opposite the tube, a bracket for slidably supporting and guiding the rod, and retarding means connected to the rod, for the purpose set forth.

8. In a motor controller, the combination of a starting resistance, a series of contact blocks connected with different points of said resistance, a series of movable short circuiting members adapted to coöperate with the contact blocks, and means for operating said short circuiting members including a vertically reciprocable bar movable into engagement with the short circuiting members, a tubular member secured to and depending from the bar, a plunger operating in the tubular member and accessible from the exterior and a stem passing loosely through the bar adjacent the connection of the cylinder thereto, a spring arranged in the tubular member and having bearing on the bar and on the plunger, rods arranged parallel to the tubular member and connected to the bar on the side opposite said tubular member, a pivotally mounted dashpot cylinder and a piston connected to the rods and working in the cylinder.

9. In a motor controller, the combination of a starting resistance, a plurality of short circuiting members, and means for operating the short circuiting members adapted to move into engagement with said members and including a bar and telescopic elements carried by said bar.

10. In a motor controller, the combination with a rotatable shaft, of a series of cams mounted to rotate therewith, a starting resistance, a plurality of independently movable short circuiting members adapted to connect with different points in the resistance, a plurality of circuit closers operatively associated with certain of the cams, means associated with one of the cams for positively operating the short circuiting members and retarding means for the operating means for the short circuiting members.

11. In a motor controller, the combination with a rotatable shaft, of a cam connected to rotate therewith, a starting resistance, a series of short circuiting members coöperating with the resistance, operating means for said members including telescoping elements, one of which is operatively associated with said cam, means connected to the other telescoping member for engaging the short circuiting members, energy storing means interposed between said telescoping members and retarding means for said operating means.

12. In a motor controller, the combination with a rotatable shaft, of a cam connected to rotate therewith, a starting resistance, a series of electrically connected independently movable short circuiting members coöperating with the resistance, each member being provided with a resilient part, operating means for said members including a bar adapted to engage the resilient parts on the short circuiting members, a tubular element connected to the bar, a plunger working in the tubular element and operatively associated with the cam and a spring adapted to store mechanical energy disposed within the tubular element.

13. In a motor controller, the combination with a rotatable shaft, of a series of cams mounted to rotate therewith, a winding, a starting resistance connected with the winding, a plurality of independently movable short circuiting members adapted to connect with different points in the resistance, current supply mains, a plurality of circuit closers controlling the mains and operatively associated with certain of the cams, means operatively associated with one of the cams for operating the short circuiting members, and means associated with said operating means for the short circuiting members adapted to retard the cutting out of the resistance permitting the operation of the circuit closers in advance of the short circuiting of the resistance connected with said winding.

14. In a motor controller, the combination of a starting resistance, short circuiting means coöperating therewith, a rotatable shaft, a series of cams thereon and rotatable therewith, a plurality of circuit closers associated with certain of the cams, and a device for operating the short circuiting means having a part which extends between the circuit closers and is operatively associated with a cam disposed intermediate the cams working the circuit closers.

15. In a motor controller, the combination of a starting resistance, short circuiting means coöperating therewith, two pairs of circuit closers, means for operating the short circuiting means and circuit closers comprising a common rotatable shaft, a series of cams mounted to rotate therewith, certain of the cams being operatively associated with the pairs of circuit closers, and a device for actuating the short circuiting means having a part extending between the pairs of circuit closers and operatively associated with a cam intermediate the cams working the circuit closers.

In testimony whereof I affix my signature in presence of two witnesses.

CLAY JEWELL.

Witnesses:
H. P. LUCAS,
J. C. M. LUCAS.